United States Patent [19]

Biggi et al.

[11] Patent Number: 5,478,889
[45] Date of Patent: Dec. 26, 1995

[54] THERMOPLASTIC COMPOSITIONS BASED ON NYLON AND POLYACRYLIC RUBBER

[75] Inventors: Aroldo Biggi; Cristina Gobbi, both of San Donato Milanese, Italy

[73] Assignee: Enichem Elastomeri S.r.l., Milan, Italy

[21] Appl. No.: 321,628

[22] Filed: Oct. 12, 1994

[30] Foreign Application Priority Data

Oct. 19, 1993 [IT] Italy .................... MI93A02214

[51] Int. Cl.⁶ .................................................. C08L 77/02
[52] U.S. Cl. .................................................. 525/183
[58] Field of Search ........................ 525/183, 66

[56] References Cited

U.S. PATENT DOCUMENTS

| | | | |
|---|---|---|---|
| 4,554,320 | 11/1985 | Reimann | 525/183 |
| 4,818,793 | 4/1989 | Matthies | 525/183 |
| 4,837,264 | 6/1989 | Zahradnik | 525/183 |
| 4,977,216 | 12/1990 | Elia | 525/183 |

FOREIGN PATENT DOCUMENTS

| | | |
|---|---|---|
| 0040926 | 12/1981 | European Pat. Off. . |
| 0283871 | 9/1988 | European Pat. Off. . |
| 0321830 | 6/1989 | European Pat. Off. . |
| 0327978 | 8/1989 | European Pat. Off. . |
| 0426482 | 5/1991 | European Pat. Off. . |

*Primary Examiner*—Patricia A. Short
*Attorney, Agent, or Firm*—Oblon, Spivak, McClelland, Maier & Neustadt

[57] ABSTRACT

Polymeric compositions basically consisting of polyamides (nylon) and acrylic rubber, are characterized by their high shock-resistance and modulus, together with high thermal characteristics. They are used in the production of moulded products, which can be used in fields which require high thermal characteristics and high modulus and at the same time a good surface appearance and excellent anti-shock properties.

6 Claims, No Drawings

THERMOPLASTIC COMPOSITIONS BASED ON NYLON AND POLYACRYLIC RUBBER

The present invention relates to polymeric compositions, basically consisting of polyamides (nylon) and acrylic rubber, characterized by their high shock-resistance and modulus, together with high thermal characteristics.

The present invention also relates to the use of these compositions for the manufacturing of products having a high shock-resistance, excellent surface appearance and good processability (mouldability) and which can be used in fields in which high thermal characteristics and high modulus are an essential characteristic.

It is known that polyamides (nylon) in general and polycaprolactam (polyamide-6 or nylon-6) in particular have a low shock-resistance immediately after moulding, whereas this property is reacquired with time following the progessive absorption of water. This characteristic of absorbing water, on the one hand, can be considered positive in that, as already mentioned, it raises the shock-resistance values, whereas on the other hand it can prevent the immediate use of the moulded items without further treatment (forced absorption of water, also called conditioning process). Water absorption is also a characteristic of all polyamides which eventually causes a lowering of the stiffness values.

Numerous methods have been proposed in the art for overcoming the above drawbacks. Among these particular importance has been given to the use of various rubbers as they are able to provide much higher shock-resistant characteristics in all operating conditions and even at low temperatures.

In these compositions however, besides an immediate improvement in the shock-resistant properties, there was a lowering of the thermal characteristics, for example Vicat (Vicat refers to the Temperature at which a pinpoint with a diameter of 1 mm penetrates for a depth of 1 mm into the material being tested when subjected to a constant load; ASTM D 1525) and modulus, together with a deterioration of the surface appearance; deterioration probably caused by the presence of high quantities of rubber phase and by the appearance of phase separation phenomena.

A first answer was found in the use of a low density polyethylene (LLDPE) grafted with maleic anhydride (see for example patent application EP 0 157 984). The result, extended to olefinic rubbers of the series ethylene-propylene, suitably grafted with maleic anhydride, had the consequence of taking into consideration the use of compositions based on polyamides (nylon) grafted with ethylene-propylene polymers; in these polymers, the lack of phase separation phenomena brought about the recover of the surface appearance characteristics and a better homogenization and dimensional stability of the rubber dispersed in nylon (but linked to it). The better homogenization and dimensional stability in turn provided these compositions with excellent shock-resistant characteristics together with a lower quantity of rubber used. Consequently, besides the above advantages, there was also a partial recovery of the characteristics (modulus and vicat) which the presence of high quantities of rubber had repressed.

The combination of characteristics obtained by these compositions has made them commercially attractive, and at the same time has stimulated proposals of transferring the results obtained also to other groups of rubbers and/or their blends. Among these rubbers, there are frequently acrylic rubbers which can determine, in compositions with Nylon, a better resistance to aging (DE 34344-820) and oils (JP 8951459).

However the commercial development of nylon compositions with a high shock-resistance is greatly penalized by the still large gap existing between nylon as such with respect to some of the characteristics (Modulus and Vicat). For example, a Nylon modified as specified above and characterized by a shock-resistance of about 800–900 J/m (Izod shock determined at 23° C.), has at the most a Vicat point of about 146° C. against 200° C. of Nylon as such, and moduli of about 1300 MPa against over 2700 MPa of Nylon as such.

Emphasis has been laid however on the fact that all the polymers used so far for giving shock-resistance to Nylon, whether consisting of only ethylene-propylene-graft-maleic anhydride rubber or acrylic rubbers alone (or various blends of these rubbers with other elastomeric phases), are characterized by the presence, from a chemical and morphological point of view, of hard phases (non-rubber plastic phases) placed either in sequence with the soft phases or grafted to these with post-grafting and/or post-polymerization (coreshell) reactions.

It has now been surprisingly found that polymeric compositions based on polyamides (Nylon), particularly polycaprolactam (Nylon 6), and particular acrylic rubbers, in which the hard phase is completely absent, enable the same shock-resistance values to be obtained as those of the acrylic rubbers and ethylene-propylene-graft-maleic anhydride rubbers of the known art, together with a considerable increase in the thermal characteristics and modulus which reach the values of 170° C. and 1900 MPa respectively. These considerable increases with respect to the values of the known art can be attributed to the decrease in quantity of rubber necessary for giving excellent shock-resitance properties, which in turn, is due to an increase in the specific efficiency of the elastomer in behaving as a shock-resistance agent.

The acrylic rubbers used in the present invention, which enable this set of properties to be reached, are produced starting only from acrylic monomers; as already mentioned, they do not contain hard phases and are not mixed with any other type of rubber, and consequently the grafting reaction on the part of the polyamide only takes place on the polyacrylate consisting of a single uniformly elastomeric phase (absence of hard phases).

The present invention therefore relates to polymeric compositions basically consisting of:
A) from 50 to 98% by weight of polyamides,
B) from 2 to 50% by weight of an acrylic rubber obtained by radicalic polymerization and containing acrylic monomers belonging to the group comprising:
   B1) from 20 to 96% by weight of butylacrylate,
   B2) from 10 to 70% by weight of ethylacrylate,
   B3) from 0 to 40% by weight of hexylacrylate,
   B4) from 0.1 to 2% by weight of acrylic acid,
   B5) from 0.1 to 2% by weight of methacrylic acid,
   B6) from 0 to 50% by weight of methoxyethylacrylate.

The present invention also relates to the use of these compositions in the production of moulded and/or extruded products.

According to a preferred aspect, the present invention relates to polymeric compositions basically consisting of:
A) from 50 to 98% by weight of caprolactam,
B) from 2 to 50% by weight of an acrylic rubber obtained by radicalic polymerization and containing acrylic monomers belonging to the group comprising:
   B1) from 20 to 96% by weight of butylacrylate,
   B2) from 10 to 70% by weight of ethylacrylate,
   B3) from 0 to 40% by weight of hexylacrylate,
   B4) from 0.1 to 2% by weight of acrylic acid, B5) from 0.1 to 2% by weight of methacrylic acid,
B6) from 0 to 50% by weight of methoxyethylacrylate.

A further aspect of the present invention relates to polymeric compositions basically consisting of:

A) from 70 to 95% by weight of polycaprolactam,
B) from 5 to 30% by weight of an acrylic rubber obtained by radicalic polymerization and containing acrylic monomers belonging to the group comprising:
B1) from 20 to 96% by weight of butylacrylate,
B2) from 10 to 70% by weight of ethylacrylate,
B3) from 0 to 40% by weight of hexylacrylate,
B4) from 0.1 to 2% by weight of acrylic acid,
B5) from 0.1 to 2% by weight of methacrylic acid,
B6) from 0 to 50% by weight of methoxyethylacrylate.

A particularly preferred aspect of the present invention relates to polymeric compositions consisting of:

A) from 70 to 95% by weight of polycaprolactam,
B) from 5 to 30% by weight of an acrylic rubber obtained by radicalic polymerization and containing acrylic monomers belonging to the group comprising:
B1) from 40 to 60% by weight of butylacrylate,
B2) from 5 to 50% by weight of ethylacrylate,
B3) from 0 to 25% by weight of hexylacrylate,
B4) from 0.5 to 1% by weight of acrylic acid,
B5) from 0.5 to 1% by weight of methacrylic acid,
B6) from 10 to 30% by weight of methoxyethylacrylate.

Polycaprolactam, known as polyamide-6, is prepared with one of the numerous methods known in the art. However the polycaprolactam used for the preparation of the compositions of the experimental part (NI-VIONPLAST 273) is sold by ENICHEM.

With respect to the acrylic rubber which forms component B) of the polymeric compositions of the present invention, this can be prepared by polymerizing the mixture of monomers in emulsion or in aqueous suspension or in solution. The method in suspension is for example described in Italian patent IT A67/797,633. A typical preparation is also described in the experimental part (see example 1).

The compositions of the present invention can, also contain, in addition to components A and B, one or more components selected from fillers, pigments, stabilizers and dyes.

The compositions of the present invention have good general characteristics with respect to processability in the preparation phase of the end-products and their application.

The properties which characterize the polymeric compositions of the present invention can be summarized as follows:

a) Izod Shock with notch at 23° C. (ASTM D 256 method) of between 800 and 1050 J/m the first value referring to the anhydrous composition (as obtained by treatment in mixer), the second value to compositions conditioned in a humid environment,
b) Vicat B (ASTM D 1525 method) with values between 170° C. and 168° C., the two values referring respectively to the anhydrous composition and that subjected to conditioning in a humid environment,
c) Flexural modulus 2000–1900 MPA (reference of values as above)
d) Elongation to break 160%.

The polymeric compositions of the present invention are prepared using any of the known methods of the art.

As a representative example of these methods the compositions are prepared by mixing the various components in a Baker-Perkins twin-screw extruder operating under vacuum.

Instead of the Baker-Perkins type mixer however, any mixer suitable for obtaining the same uniform mixing of the components can be used. During this mixing, commonly known as reactive-blending, the polyamide grafts to the acrylic rubber, utilizing suitable reactive points present on the latter, to produce a product which has shock, fluidity and surface appearance characteristics similar to those that can be obtained by grafting the polyamide to commercial rubbers of the group ethylene-propylene-maleic anhydride, but with surprisingly higher thermal (Vicat) and modulus characteristics.

Having described the general aspects of this invention, the following specific examples have the sole purpose of illustrating the details but should in no way be considered as being restricting. All the compositions and percentages indicated unless otherwise stated are expressed by weight.

EXAMPLE 1

PREPARATION OF A TYPICAL ACRYLIC RUBBER

An elastomeric acrylic copolymer was prepared starting from the following monomers:
ethyl acrylate 84% by weight;
butyl acrylate 15% by weight;
acrylic acid 1% by weight.

The copolymer was prepared by emulsion polymerization using the following quantities of raw materials (necessary for obtaining 1 Kg of latex):

| monomers | 320 g |
| --- | --- |
| sodium lauryl sulphate | 5 g |
| potassium persulphate | 100 g |
| (aqueous sol. at 1% by weight) | |
| sodium metabisulphite | 100 g |
| (aqueous sol. at 1% by weight) | |
| deionized water | 475 g |

The percentage composition of the monomers for the 4 copolymers is the one shown above.

The polymerization is carried out as follows:

Deionized water (200 g) and sodium lauryl sulphate (1 g) are charged into a 2 liter glass reactor, equipped with a stirrer, reflux cooler and thermometer placed in a water bath with heating and cooling devices.

The reaction environment is made inert with a flow of pure nitrogen and the temperature of the bath is brought to 60° C. When the temperature inside the reactor reaches 50° C., the aqueous solution of potassium persulphate, the solution of sodium metabisulphite and a suspension of monomer in water containing the remaining surface-active reagent (4g) are fed contemporaneously from three different adduction tubes. This feeding is completed in about 3 hours. Shortly after the feeding has started the reaction begins to take place and, being an exothermic reaction, tends to make the temperature rise inside the reactor.

The temperature is left to rise to 55° C. and is kept at this value by cooling the outside until the feeding has been completed.

To complete the reaction, the temperature is then brought to 70° C. and kept at this value for 30 min.

The latex thus obtained is then left to cool and coagulated with a solution of CaCl$_2$ and the coagulate, washed with water, is then dried.

PREPARATION OF THE POLYMERIC COMPOSITION

The two components A and B of the polymeric composition of the present invention, accurately dried for 2.5 hrs at 100° C. in an oven with air circulation, are fed into a Baker-Perkins twin-screw extruder, using two weight distributors. A few percentage parts of at least one stabilizer selected from the group of phosphites and hindered phenols were added to component B, before being charged into the distributors.

The extruder (Baker Perkins having a diameter of 35 mm with 1/d=32) is equipped with a degassing system (vacuum pump) which has the purpose of eliminating the residual and reaction water and is characterized by a screw profile typical for the extrusion of nylon.

Operating at 250 revs/min with a thermal profile basically centred on 280° C. and a total feeding of the mixture of the two components A+B equal to 14 Kg/hour, different compositions of mixtures of A+B were extruded and granulated.

Using an injection press made by the company Sandretto, series 8 of 100 tons, test samples (ASTM) were obtained for the characterization of the mixtures. Table 1 shows the characteristics of the mixtures together with those of nylon as such used in the experiment, and those of a mixture obtained by blending with a nylon-6 (component A; it is a polycaprolactam produced by ENICHEM with the tradename 273 MR) an acrylic rubber (component B) having a molecular weight MW=2×10$^6$ produced by ENICHEM, and having the following composition: ethylacrylate 17%; butylacrylate 55%; methoxyethylacrylate 27%; acrylic acid 0.5%; methacrylic acid 0.5%.

As a comparative test, apart from nylon as such (TEST No.0) a composition containing a copolymer ethylene-propylene grafted with maleic anhydride (commercial product EXXELOR 1801 X) was used (Test No.6).

mixtures containing acrylic rubber (tests 1–2) have much higher shock characteristics (greater efficiency with anti-shock system).

On the other hand, if the anti-shock properties are taken into consideration, it can be seen that, with the same Izod shock values (test 3 and test 6), these values can be reached using a lower quantity of rubber in the case of acrylic rubber (test 3); as explained in the text, the decrease in quantity of rubber with the same Izod values, enables the compositions to have Flex. Modulus and Vicat values which are very close to those of nylon as such and which however greatly differ from those of the mixture with the copolymer ethylene-propylene grafted with maleic anhydride (test 6).

We claim:

1. A polymeric composition consisting essentially of:
   A) from 50 to 98% by weight of polycaprolactam,
   B) from 2 to 50% by weight of an acrylic rubber obtained by radical polymerization and containing no hard phases, said rubber consisting essentially of acrylic monomers in the following amounts:
      B1) from 20 to 96% by weight of butylacrylate,
      B2) from 4 to 70% by weight of ethylacrylate,
      B3) from 0 to 40% by weight of hexylacrylate,
      B4) from 0.1 to 2% by weight of acrylic acid,
      B5) from 0.1 to 2% by weight of methacrylic acid,
      B6) from 0 to 50% by weight of methoxyethylacrylate.

2. A molded or extruded product comprising the polymer composition of claim 1.

3. A polymeric composition according to claim 1 wherein component A) is present from 70 to 95% by weight and component B) is present from 5 to 30% by weight.

4. A molded or extruded product comprising the polymer composition of claim 3.

5. A polymeric composition according to claim 3, wherein component B) contains the following amounts of monomers:
   B1) from 40 to 60% by weight of butylacrylate,
   B2) from 5 to 50% by weight of ethylacrylate,
   B3) from 0 to 25% by weight of hexylacrylate,
   B4) from 0.5 to 1% by weight of acrylic acid,
   B5) from 0.5 to 1% by weight of methacrylic acid,
   B6) from 10 to 30% by weight of methoxyethylacrylate.

TABLE 1

| TEST N° (*) | Component B % w/w | IZOD 120D () at 23° C. | IZOD 120D () at −40° C. | Flexural (*) | VICAT (**) |
|---|---|---|---|---|---|
| 0 (NYLON 6) | 0 | 30 | 26 | 2700 | 200 |
| 1 | 25 | 1250 | — | 950 | 144 |
| 2 | 20 | 1050 | — | 1750 | 163 |
| 3 | 17.5 | 900 | 115 | 2050 | 170 |
| 4 | 15 | 550 | 115 | 2200 | 175 |
| 5 | 10 | 150 | — | 2450 | 184 |
| 6 | 22.5 (*****) | 820 | 118 | 1300 | 146 |

(*) dried materials with a water content of <0.2% by weight
(**) Izod Shock according to ASTM D 256
(***) Flexural Modulus according to ASTM D 790.
(****) VICAT according to ASTM D1525.
(*****) saturated copolymer grafted with maleic anhydride and produced by EXXON under the name EXXELOR 1801 X.

The results of the table show first of all, as is already known, that the shock resistance of the compositions depends on the quantity of rubber present in them. However, with the same quantity of rubber (tests No.1–2 and 6), the 6. A molded or extruded product comprising the polymer composition of claim 5.

* * * * *